United States Patent [19]

Strauss

[11] Patent Number: 5,077,703
[45] Date of Patent: Dec. 31, 1991

[54] UNDERWATER GUIDANCE SYSTEM

[76] Inventor: David Strauss, 209-39 23rd Ave., Bayside, N.Y. 11360

[21] Appl. No.: 638,773

[22] Filed: Jan. 8, 1991

[51] Int. Cl.$^5$ .............................................. G01S 3/80
[52] U.S. Cl. ..................................... 367/118; 367/910
[58] Field of Search ............... 367/118, 129, 124, 910; 342/419

[56] References Cited

U.S. PATENT DOCUMENTS 2,962,697 11/1960 Rockwell ............................ 367/129
3,587,038 6/1971 Massa, Jr. ............................ 367/910

Primary Examiner—Daniel T. Pihulic
Attorney, Agent, or Firm—Terry M. Gernstein

[57] ABSTRACT

An underwater guidance system includes a transmitter located at a home base and generating a signal having a prescribed frequency. A diver wears a receiver on his wrist. The receiver includes a plurality of direction indicating elements and an out-of-range indicating element. The diver views the receiver to determine his position relative to the transmitter.

10 Claims, 4 Drawing Sheets

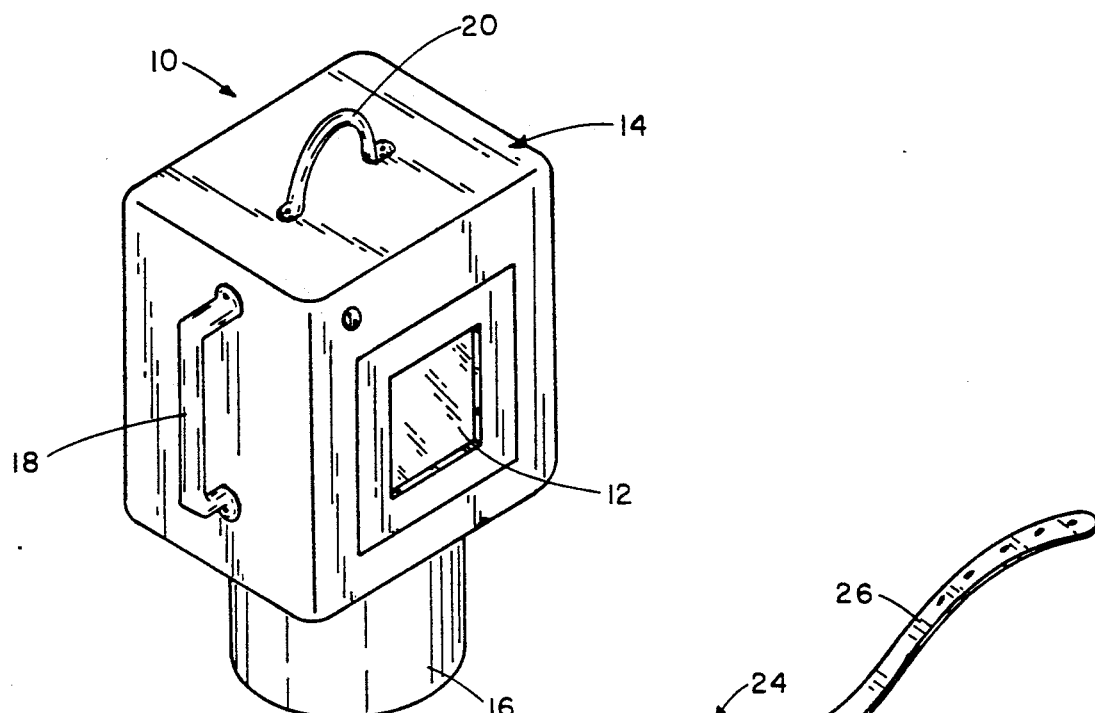
FIG. 1
FIG. 2
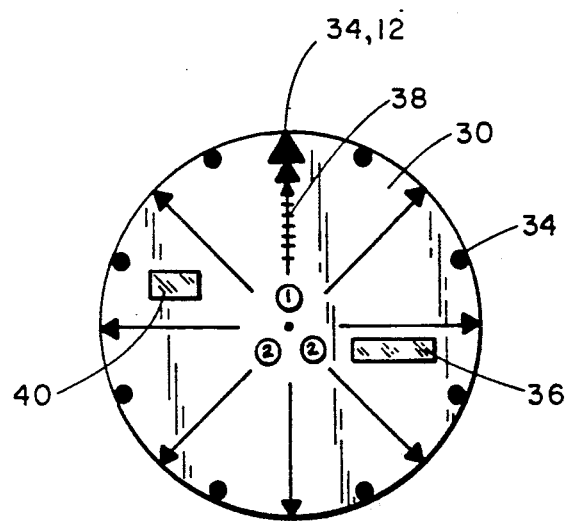
FIG. 3

UNDERWATER GUIDANCE SYSTEM

TECHNICAL FIELD OF THE INVENTION

The present invention relates to the general art of underwater communication equipment, and to the particular field of underwater guidance systems for use by divers.

BACKGROUND OF THE INVENTION

Underwater divers often need to find their way back to an anchored surface craft, to relocate an earlier-discovered object, to keep track of a companion diver, or to otherwise navigate underwater with respect to a particular reference location. Poor underwater visibility frequently makes visual navigation difficult or impossible, and a diver must rely on dead reckoning or a compass to obtain his bearings. Often, the diver is required to surface to obtain proper bearings. This is an onerous requirement, and may even be dangerous in some instances.

The use of a compass may be difficult and unreliable if multiple turns are executed and turns are spaced apart by great distances. Small errors can result in large deviations from proper locations. Due to the errors inherent in such underwater navigation techniques, many divers constantly check their bearings. This can be wasteful of valuable underwater dive time as well as being inaccurate.

Therefore, the art has included several designs intended to improve a diver's underwater navigation capabilities. However, most of these designs are difficult and cumbersome to use and carry. Still other devices require a diver to orient the device in various directions until a proper bearing is discovered. This requirement may be time consuming and still not be entirely accurate.

Still further, it is often important for a diver to know how far away he is from the reference location. This will give him information regarding how much farther he can move and the like. Many devices presently available in the art do not readily provide such distance from base information.

Therefore, there is a need for an underwater guidance apparatus that is easy to carry and easy to use while still being accurate and while still providing information regarding a diver's distance from a reference location.

OBJECTS OF THE INVENTION

It is a main object of the present invention is to provide an underwater guidance apparatus that is easy to carry.

It is another object of the present invention to provide an underwater guidance apparatus that is easy to carry and easy to use.

It is another object of the present invention to provide an underwater guidance apparatus that is easy to carry and easy to use while still being accurate.

It is another object of the present invention to provide an underwater guidance apparatus that is easy to carry and easy to use while still being accurate and while still providing information regarding a diver's distance from a reference location.

SUMMARY OF THE INVENTION

These, and other, objects are achieved by an underwater guidance apparatus that includes a receiver worn on the wrist in the manner of a wrist watch and a transmitter. The receiver has circuitry that not only warns the diver that he is out of a prescribed range with respect to the transmitter, but also will provide directions toward the transmitter at a glance. The receiver need not be turned or oriented by the diver in order to determine his position relative to the transmitter. In this manner, the diver can tell at a glance whether he is still within a prescribed area relative to the transmitter and what his position is relative to that transmitter.

BRIEF DESCRIPTION OF THE DRAWING FIGURES

FIG. 1 is a perspective view of a transmitter used in the underwater guidance system embodying the present invention.

FIG. 2 is a perspective view of a wrist-worn receiver used in the underwater guidance system of the present invention.

FIG. 3 is a top plan view of the face of the receiver shown in FIG. 2.

DETAILED DESCRIPTION OF THE PREFERRED EMBODIMENT OF THE INVENTION

Figure 4:
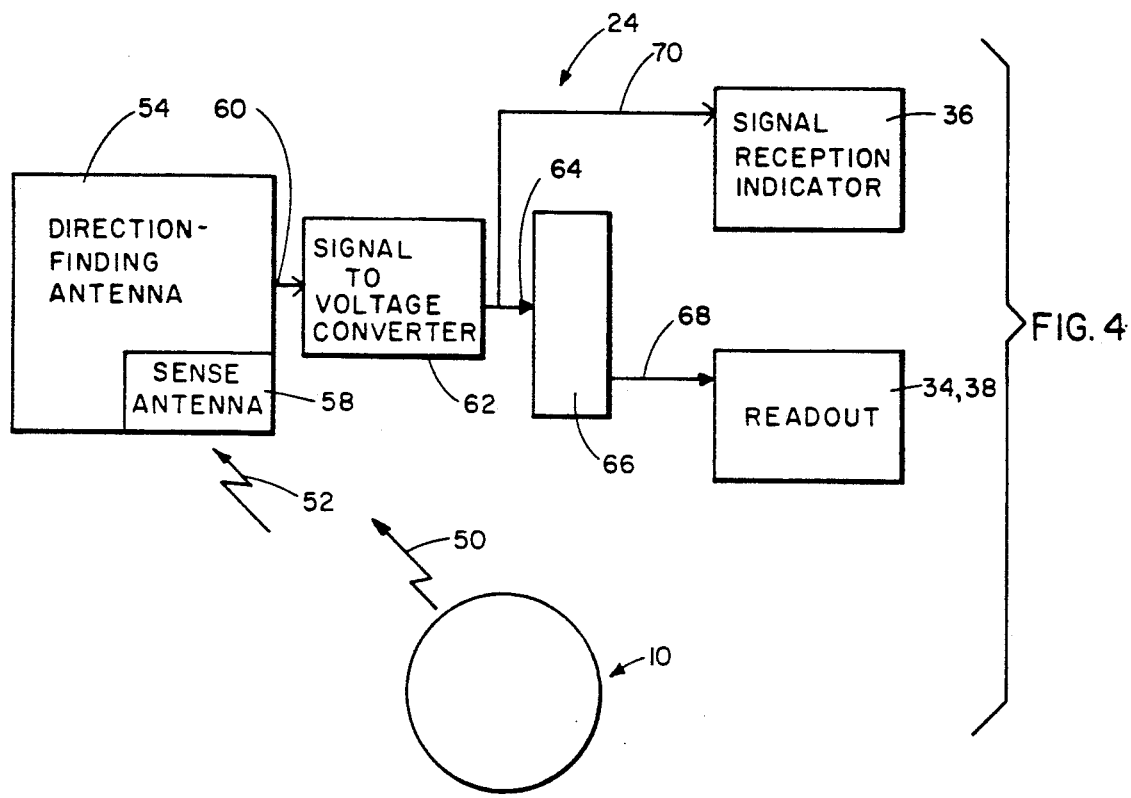
FIG. 4 is a block diagram illustrating the overall system of the underwater guidance system of the present invention.

Shown in FIG. 1 is a transmitter 10 that generates suitable signals, such as microwave, radio signals or the like. The transmitter includes appropriate circuitry for generating such signals, and is located at an appropriate position. Such position can be a dive boat, home base or the like. In one form of the transmitter, the signal is directional, and is emitted through a window 12 in a watertight case 14. The case is mounted on an object by a support 16, and includes handles 18 and 20. In another form of the transmitter, the signal generated by the transmitter is omnidirectional, and will cover a specified range around the transmitter. The range of this signal can be adjusted according to the needs of the divers using it. For example, the range of the signal can be set to that range safe for the particular divers or the like. The transmitter is also set so that as the distance from the transmitter increases, the frequency of the signal received therefrom decreases.

Shown in FIGS. 2 and 3 is a wrist-worn receiver 24 that is worn by the diver and receives the signals generated by the transmitter. These signals are converted into data for use by the diver to determine his distance from the transmitter as well as his direction relative to the transmitter. The receiver is simply viewed in the manner of a wrist watch for this data. The receiver includes a wrist band 26 attached to a water-tight housing 28. The housing includes a face 30 covered by a water-proof cover 32. The face includes a plurality of position indicating signal elements, such as element 34 as well as an out-of-range indicator signal element 36. The signal element 36 can be both visible and audible as suitable. A suitable converter can be included to indicate depth or distance to the transmitter in signal element 36 if suitable.

An appropriate arrow signal 38 can be associated with each of the position indicating signal elements and will be activated when the appropriate position indicating signal element is activated as will be explained below. The receiver 24 can also include a compass. A low battery display 40 is also included on the receiver.

The receiver indicates the diver's position relative to the transmitter by having an appropriate one of the position indicating elements 34 light up in an appropriate manner along with the arrow 38. That is, if the transmitter is at the twelve o'clock position relative to the receiver shown in FIG. 3, the element $34_{12}$ along with the arrow 38 will light up, with the element $34_{12}$ lighting up green, while all other elements 34 are lit red. The diver can thus determine at a glance what his position is relative to the transmitter. As long as the diver is within the prescribed range with respect to the transmitter, the indicator 36 will not be activated. However, should the diver move out of the prescribed range, the indicator 36 will be activated, and will emit a signal, either visible or audible or both to alert the diver that he has moved out of the prescribed range relative to the transmitter.

Operation of the guidance system can be understood from the above description, and includes placing the transmitter at a specified location, and operating that transmitter to generate a signal in a particular direction or omnidirectionally as desired. The diver wears the receiver and periodically glances at the receiver to determine if he is still in range of the transmitter and to determine his position relative to the transmitter.

The particular systems and circuits included in the guidance system are indicated in FIGS. 4–8. The transmitter 10 emits a signal 50 that is received as signal 52 by the receiver and converted into the above-discussed data information for the diver. The received signal 52 has a frequency that is dependent on the frequency of the signal 50 generated by the transmitter. The received signal is incident on a particular portion of the receiver depending on the orientation of the receiver with respect to the transmitter. This feature is used by the receiver to provide a readout of the relative position between the receiver and the transmitter.

The received signal is incident on a direction finding antenna 54, that includes a loop that generates an antenna output signal that varies in strength according to the angle between the loop and the incoming signal. When the loop is parallel to the incoming signal, the antenna output signal is the strongest. When the loop is perpendicular to the incoming signal, the antenna output signal is the weakest, or is completely indiscernible. A sense antenna 58 is included to avoid confusion by differentiating between actual and reciprocal bearings.

The direction finding antenna 54 generates an antenna output signal 60 that has a strength dependent on the orientation of the antenna with respect to the incoming signal 52. Each element 34 includes a direction finding antenna associated therewith. Thus, there are a plurality of direction finding antennas, and the element $34_{12}$ has a direction finding antenna $54_{12}$ associated therewith so that the element $34_{12}$ will be activated when the antenna $54_{12}$ has an antenna output signal 52 incident thereon in a direction sufficiently parallel to the antenna to generate a signal 60 above a preset strength. If the antenna $54_{12}$ is not oriented parallel to the incoming signal 52, it will not generate a signal 60 that is strong enough to operate the element $34_{12}$. In the preferred form of the invention, when the signal associated with an element 34 is below a certain level, that element will glow red, and when the signal associated with that element is above that preset level, the element will glow green. The other elements 34 also have direction finding antennas associated therewith with each cooperating set of elements operating in the just-described manner. This permits a diver to simply lift his wrist into view, and see which element 34 is lit green to determine his position relative to the transmitter. The contrast between the green and the red LEDs will serve to immediately draw attention to the correct heading, even in murky water or low light conditions.

The signal 60 generated by the antenna 54 is converted to a voltage by a signal-to-voltage converter circuit 62. The circuit 62 generates an output voltage 64 that is applied to an undervoltage/overvoltage comparator 66 that generates a signal 68 that activates a position indicating element associated therewith to glow green or red depending on whether the voltage level is above or below a preset value. The comparator 66 activates the elements 34 and/or 38 if the voltage is high enough. As discussed above, if the voltage is high enough, the elements 34 will be activated to glow green; whereas, if the voltage is below a preset value, the elements 34 will be activated to glow red. The signal to voltage converter 62 activates the element 36 via signal 70 if the voltage is below a specified value. Depending on the orientation of the receiver with respect to the transmitter, a particular element 34G (green) or 34R (red) will be activated. The diver will immediately know his orientation with respect to the transmitter.

If desired, suitable timer circuits can be included so the selected element 34 and/or arrow 38 will blink.

Figure 5:
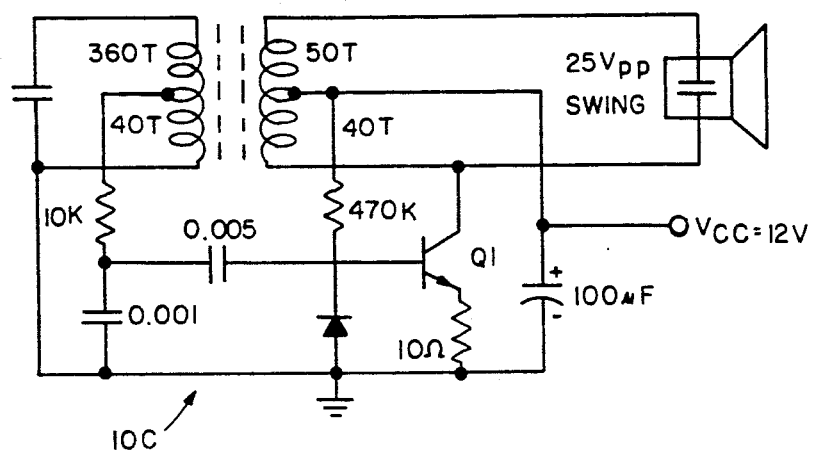
FIG. 5 is a circuit diagram of a preferred form of a frequency transmitter used in the underwater guidance system of the present invention.
Figure 6:
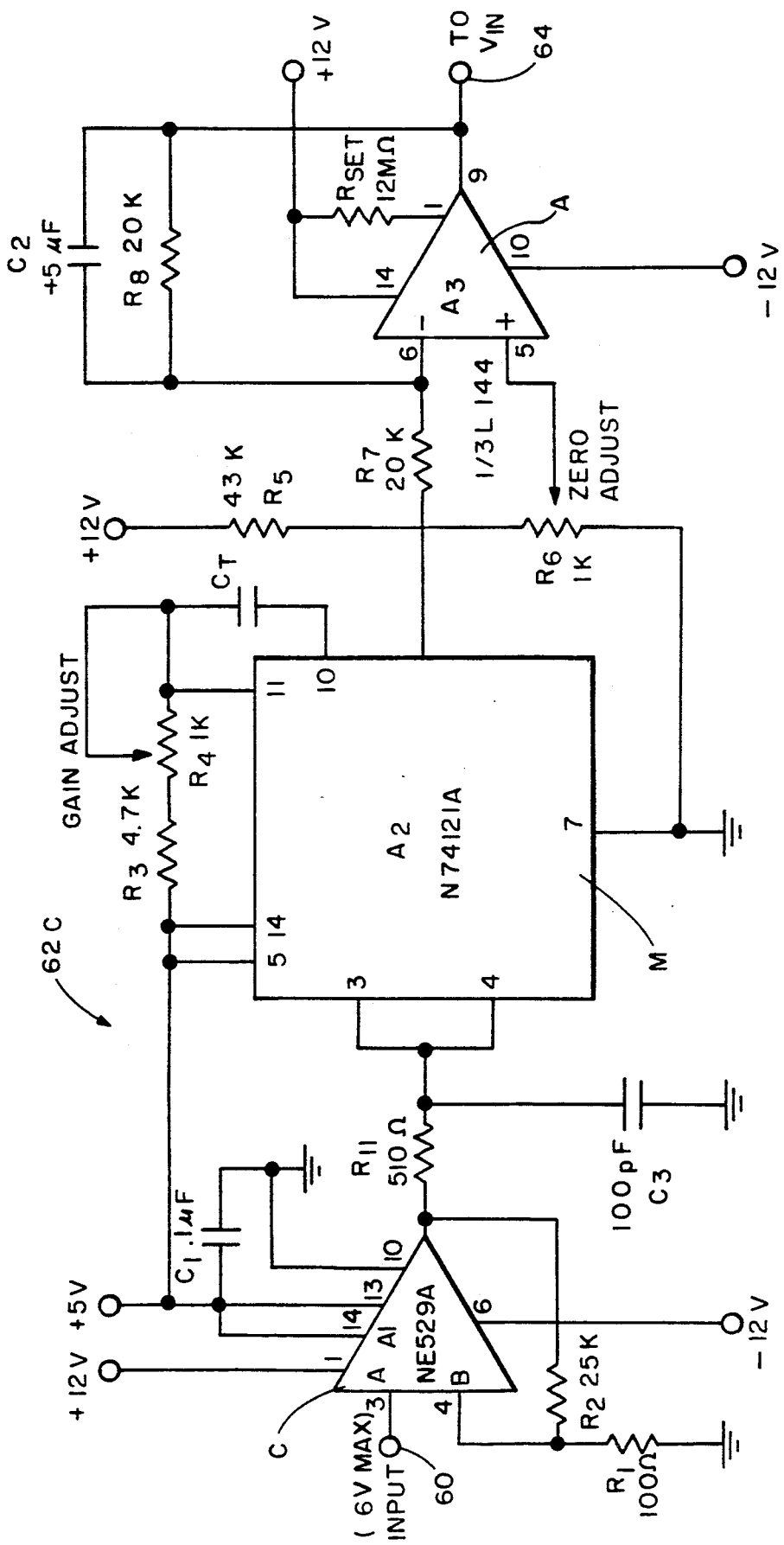
FIG. 6 is a circuit diagram of a preferred form of a frequency-to-voltage converter used in the underwater guidance system of the present invention.
Figure 7:
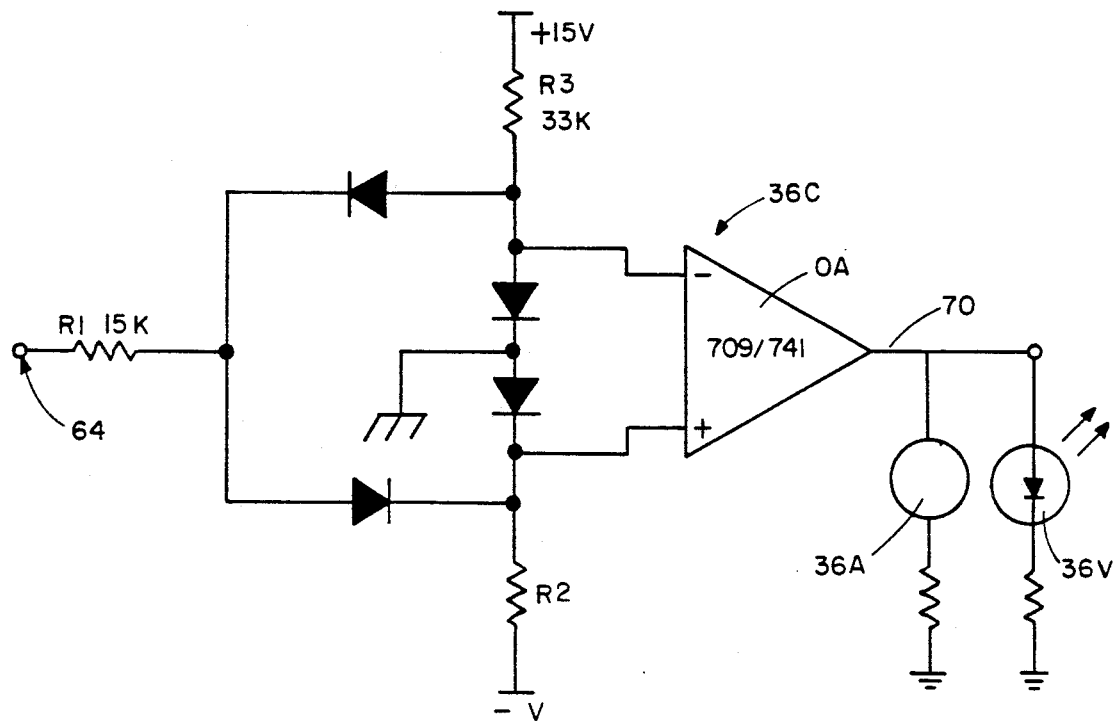
FIG. 7 is a circuit diagram of a preferred form of a dual limit comparator that provides a positive voltage output when input voltage exceeds a predetermined value used in the underwater guidance system of the present invention.
Figure 8:
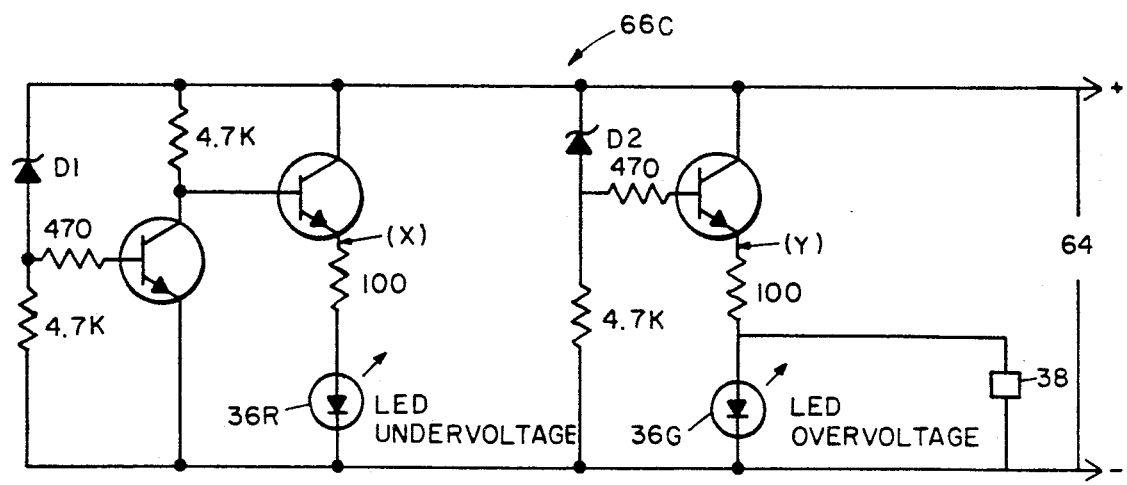
FIG. 8 is a circuit diagram of a preferred form of a an undervoltage/overvoltage indicator used in the underwater guidance system of the present invention to drive an LED display when voltage applied thereto goes above or below a predetermined 10 value.

The preferred form of the various circuits are shown in FIGS. 5–8. Therefore, the transmitter circuit 10C is illustrated in FIG. 5; the frequency-to-voltage converter circuit 62C is shown in FIG. 6; the out-of-range circuit 36C is illustrated in FIG. 7; and the undervoltage/overvoltage circuit 66C is illustrated in FIG. 8.

The circuit 62C converts frequency to voltage by taking the average dc value of the pulses from the monostable multivibrator M. The one shot is triggered by the positive-going ac signal at the input of the comparator C. The amplifier A acts as a dc filter, and also provides zeroing.

The comparator circuit 36C gives a positive output voltage when the input voltage exceeds a predetermined value. Between zero and the predetermined value, the output voltage is negative. The positive limit point is determined by the ratio of R1, R2 and the negative point by R1, R3. The forward voltage drop across the diodes must be allowed for, and the output can be inverted by reversing the inputs to the op-amp OA. The visible alarm 36V is activated by the output voltage of the op-amp OA, and the audible alarm 36A can also be activated at the same time.

The undervoltage/overvoltage circuit 66C will make the appropriate LED 36R or 36G glow if the monitored voltage goes below or above the value determined by zener diodes D1 and D2.

It is understood that while certain forms of the present invention have been illustrated and described herein, it is not to be limited to the specific forms or arrangements of parts described and shown.

I claim:

1. An underwater guidance system comprising:
   (A) a transmitter unit which includes a circuit means which generates a guidance signal;
   (B) a receiver unit which includes
   (1) a wrist strap for attaching said receiver unit to a diver's wrist,
   (2) a watertight housing having a face,
   (3) a plurality of position indicating elements mounted on said face, each position indicating element including a green LED and a red LED,
   (4) a plurality of direction-finding antennas mounted in said housing at spaced apart locations about said housing, each direction-finding antenna including a loop and generating a signal that varies in strength according to an angle between said loop and said guidance signal, each of said plurality of direction-finding antennas being associated with one of said plurality of position indicating elements,
   (5) a signal-to-voltage converter mounted in said housing and connected to each direction-finding antenna and having an output voltage associated therewith when said each direction-finding antenna generates an antenna signal above a preset strength level,
   (6) a dual limit comparator connected to said signal-to-voltage converter and generating a positive voltage output when said signal-to-voltage converter output voltage exceeds a predetermined value,
   (7) an out-of-range indicator element mounted on said face and connected to said dual limit comparator and being activated when said dual limit comparator output voltage is positive,
   (8) an undervoltage/overvoltage comparator associated with each position indicating element, each undervoltage/overvoltage comparator being mounted in said housing, each undervoltage/overvoltage comparator being connected to said signal-to-voltage converter and to said each position indicating element and activating said each position indicating element green LED if said signal-to-voltage converter output voltage is above a preset value and activating said each position indicating element red LED if said signal-to-voltage converter output voltage is below said preset value.

2. The guidance system defined in claim 1 further including a sense antenna connected to said direction-finding antenna.

3. The guidance system defined in claim 2 wherein said out-of-range indicator element further including a visible alarm element.

4. The guidance system defined in claim 3 wherein said out-of-range indicator element further including an audible alarm element.

5. The guidance system defined in claim 4 wherein each of said position indicator elements further includes an arrow element.

6. The guidance system defined in claim 5 wherein said signal-to-voltage converter element includes a monostable multivibrator.

7. The guidance system defined in claim 6 wherein said signal-to-voltage converter element includes a comparator.

8. The guidance system defined in claim 5 wherein said signal-to-voltage converter element includes an amplifier that acts as a dc filter.

9. The guidance system defined in claim 8 wherein said dual limit comparator includes a plurality of resistors, and the positive output is determined by a ratio between two of said resistors.

10. The guidance system defined in claim 9 wherein said undervoltage/overvoltage comparator includes two zener diodes.

* * * * *